United States Patent [19]

Fukami

[11] Patent Number: 5,285,326
[45] Date of Patent: Feb. 8, 1994

[54] DIGITAL SIGNAL PROCESSOR FOR CONVERTING BETWEEN 4-CHANNEL PCM SIGNALS AND 2-CHANNEL PCM SIGNALS

[75] Inventor: Tadashi Fukami, Kanagawa, Japan

[73] Assignee: Sony Corporation, Tokyo, Japan

[21] Appl. No.: 912,226

[22] Filed: Jul. 10, 1992

Related U.S. Application Data

[63] Continuation of Ser. No. 556,473, Jul. 24, 1990, abandoned.

[30] Foreign Application Priority Data

Jul. 29, 1989 [JP] Japan ................................. 1-197828
Dec. 30, 1989 [JP] Japan ................................. 1-340261

[51] Int. Cl.⁵ ........................ G11B 5/09; G11B 15/14
[52] U.S. Cl. ........................................ 360/32; 360/64
[58] Field of Search .................. 360/32, 48, 8, 61, 64; 369/59, 60

[56] References Cited

U.S. PATENT DOCUMENTS

| | | | |
|---|---|---|---|
| 4,628,373 | 12/1986 | Takahashi et al. | 360/32 |
| 4,719,521 | 1/1988 | Juso | 360/32 |
| 4,758,907 | 7/1988 | Okamoto et al. | 360/32 |
| 4,768,108 | 8/1988 | Higurashi | 360/32 |
| 4,862,292 | 8/1989 | Enari et al. | 360/32 |
| 5,157,557 | 10/1992 | Oohashi et al. | 360/32 |

FOREIGN PATENT DOCUMENTS

| | | | |
|---|---|---|---|
| 128577 | 12/1984 | European Pat. Off. | G11B 5/52 |
| 197560 | 10/1986 | European Pat. Off. | G11B 20/10 |
| 58-73008 | 5/1983 | Japan | G11B 5/09 |
| 60-66367 | 4/1985 | Japan | G11B 20/10 |
| 61-175908 | 8/1986 | Japan | G11B 5/09 |
| 62-231405 | 10/1987 | Japan | G11B 5/09 |
| 2082426 | 3/1982 | United Kingdom | H03K 13/24 |

*Primary Examiner*—Donald Hajec
*Assistant Examiner*—Won Tae C. Kim
*Attorney, Agent, or Firm*—Lewis H. Eslinger; Jay H. Maioli

[57] ABSTRACT

A digital audio tape recorder signal processor whose signal processing period is Td performs signal processing for recording 2-channel PCM signals having a sampling frequency of Fs. A circuit is provided for compressing the time-base of 4-channel PCM signals by one-half to form 2-channel time-base-compressed PCM signals in which the first and second channels are time-divided and multiplexed and the third and fourth channels are time-divided and multiplexed, so that when the time-base-compressed PCM signal is supplied to the signal processor, the signal processor is operated with a sampling frequency of 2Fs and the signal processing period is changed to ½ Td.

5 Claims, 9 Drawing Sheets

32K—LP MODE

32K—4CH MODE

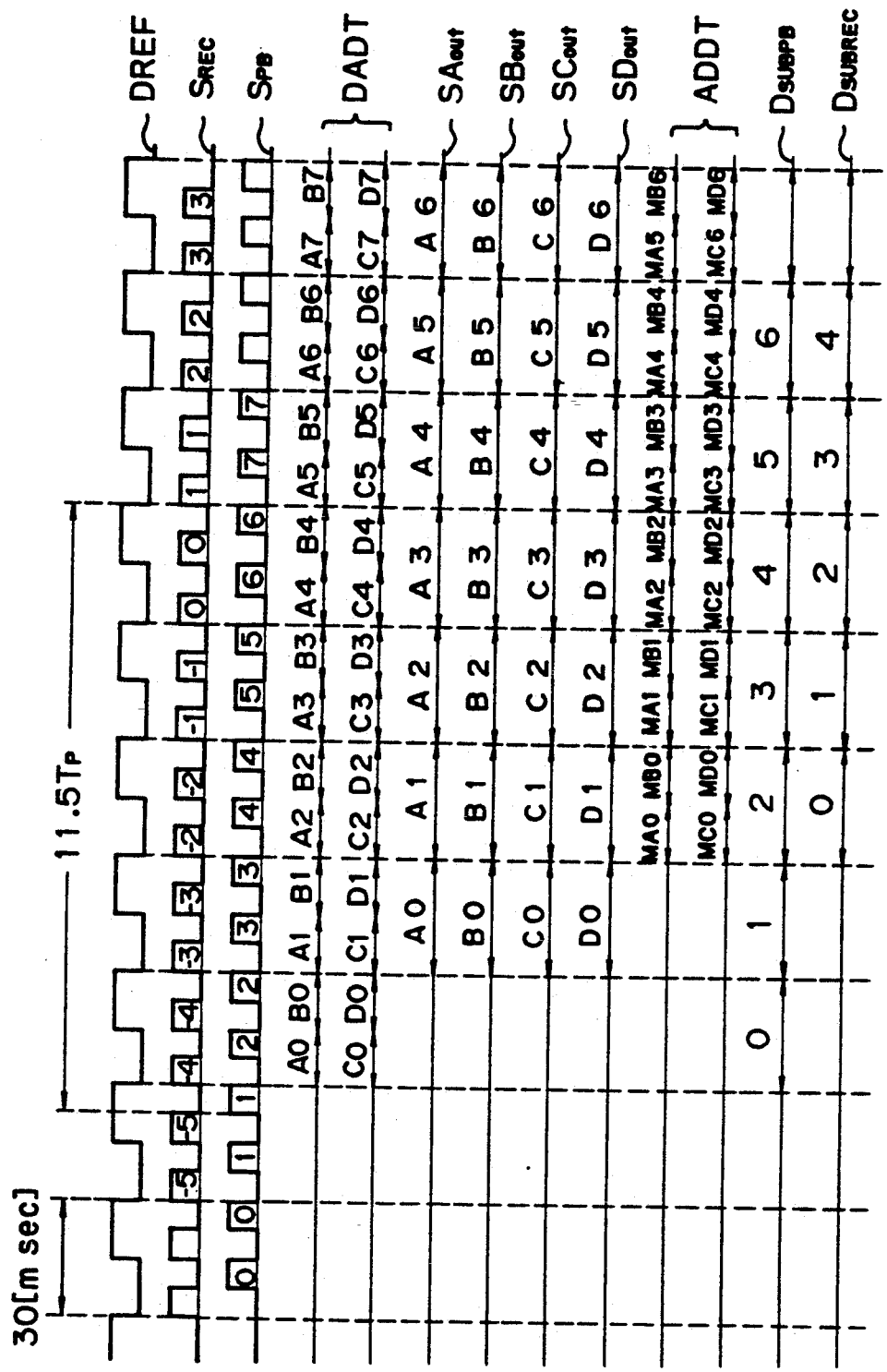

DIGITAL SIGNAL PROCESSOR FOR CONVERTING BETWEEN 4-CHANNEL PCM SIGNALS AND 2-CHANNEL PCM SIGNALS

This is a continuation of application Ser. No. 07/556,473, filed Jul. 24, 1990 abandoned.

BACKGROUND OF THE INVENTION

1. Field of the Invention

This invention relates in general to a signal processing apparatus used in a rotary-head, digital tape recorder and, more particularly, to signal processing apparatus used in recording and playing back 4-channel PCM audio signals.

2. Description of the Prior Art

Six different recording modes are employed in the field of rotary-head, digital tape recorders (R-DAT), and the standard mode is the 48k mode adapted to record and play back a 2-channel signal. In the 48k mode, the sampling frequency is 48 kHz, the quantizing bit number is 16 bits for linear quantization, the tape speed is 8.15 mm/s, and the drum speed is 2000 rpm. There is also an optional 32k-LP mode adapted to record and play back 2-channel signals. In the 32k-LP mode, the sampling frequency is 32 kHz, the quantizing bit number is 12 bits for nonlinear quantization, and the drum speed is 1000 rpm. In the 32k-LP mode, only one half of the amount of information can be accommodated compared with the 48k mode, and the data transmission rate is also reduced by one half. Therefore, the tape speed is one half the speed in the 48k mode, and a long recording time is possible.

In the field of R-DAT, a mode for recording and playback of a 4-channel PCM audio signal is established. In the 32k-4CH mode, the sampling frequency is 32 kHz and the quantizing bit number is 12 bits for nonlinear quantization, as in the 32k-LP mode. The information amount, however, because of using four channels, is the same as that of the standard or 48k mode, with the same tape speed and the same drum revolution rate as those described above.

In the field of R-DAT, error correction is carried out in each unit of 8-bit data, typically called a symbol, and this requires conversion of the original 16-bit data or 12-bit data into symbols. In the case of 16-bit data, the upper significant 8 bits and the lower significant 8 bits are formed into two different symbols. In the case of 12-bit data, however, which is not an integral multiple of 8 bits, a plurality of 12-bit data are converted into a plurality of symbols. FIG. 1 represents a conversion rule for converting 12-bit words to symbols in the 32k-LP mode. Eight 12-bit words, L0, R0, L1, R1, L2, R2, L3, R3, for example, of the PCM audio signal are converted into twelve words of 8 bits each, representing twelve symbols. The remaining PCM audio signal consisting of words L4, R4, ..., L959, R959 are also converted into symbol units in the same manner.

FIG. 2 represents a conversion rule for word-to-symbol conversion in the 32k-4CH mode. Reference symbols A0, B0, C0 and D0 denote PCM audio signals of twelve bits each for four channels, A to D, respectively. It will be appreciated from the apparent differences between FIGS. 1 and 2 that the word-to-symbol conversion rule is different in the 32k-LP mode and the 32k-4CH mode. Furthermore, the 32k-LP mode employs a signal processing period Td of 60 ms, which is equal to the rotation cycle of the drum. In the 32k-4CH mode, a signal processing period of Td/2 of 30 ms is employed.

In addition to the standard 48k mode, two systems are known for establishing the R-DAT 4-channel mode. One is a system wherein the signal processor is designed to be operative with a sampling frequency of 32 Khz and an address generating circuit operative under the aforementioned 4-channel mode conversion rule. The other system advantageously utilizes the fact that the data transmission is identical between the 32k-4CH mode and the standard 48k mode and activates its processor in the 48k mode. Also, the other system scrambles data, at the input side of the processor during recording or at the output side of the processor during playback, to perform the 12-to-16 data conversion and, at the same time, the conversion of the sampling frequency.

The first system uses an address generating circuit or other equivalent circuit peculiar to the 4-channel mode, so that it has the drawback that the scale of the hardware of the processor is increased. The second system, which requires some additional circuits for the 4-channel mode in the processor, makes it necessary to modify the existing processor that is typically in the form of an LSI, thereby requiring redesign of the LSI.

In addition, if multi-channel digital audio signals other than a stereo system can be recorded or reproduced with the digital audio tape recorder of this kind, as is done using a conventional audio tape recorder configured to record and reproduce an analog signal, the usefulness of the digital audio tape recorder will be improved significantly.

Moreover, if the digital audio tape recorder is capable of recording and reproducing a digital audio signal between channels, then mixing processing, edit processing, and the like of the digital audio signal may be carried out as desired, and the usefulness of the recorder will be further improved.

OBJECTS AND SUMMARY OF THE INVENTION

Therefore, it is an object of this invention to provide a 4-channel PCM signal processing apparatus that can overcome the above-noted defects inherent in previously proposed systems.

It is another object of this invention to provide a 4-channel PCM signal processing apparatus that can perform recording and playback in the 32k-4CH mode by adding an external circuit to its processor and overcoming the drawbacks of the conventional system.

A further object of this invention is to provide a 4-channel PCM signal processing apparatus capable of recording and reproducing multi-channel digital audio signals.

According to an aspect of this invention, a 4-channel PCM signal processing apparatus for recording 4-channel PCM signals has a sampling frequency Fs and includes a processor having a signal processing period Td that performs the signal processing necessary for recording 2-channel PCM signals having a sampling frequency of Fs. The processing apparatus also includes a compressing circuit for compressing the time-base of the 4-channel PCM signals by one half to form 2-channel time-base compressed PCM signals in which the first and second channels are time-divided and multiplexed and the third and fourth channels are time-divided and multiplexed. In this case, the processor is operated with a sampling frequency of 2Fs when the time-base-compressed PCM signals are supplied, and the signal processing period is changed to one half the previous period.

According to another aspect of the invention there is provided a 4-channel PCM signal processing apparatus for reproducing 4-channel PCM signals having a signal processing period of Td for performing signal processing for reproducing 2-channel PCM signals having a sampling frequency Fs. The processor is operated with a sampling frequency of 2Fs when the 4-channel PCM signal is reproduced, and the signal processing period is one half of the previous period. 4-channel PCM signals are reproduced by doubling the time-base of one channel of the 2-channel PCM signal output from the processor and distributing the time-base expanded PCM signal to the first and second channels of the 4-channel PCM signal, and by doubling the time-base of the other channel PCM signal of the 2-channel PCM signal and distributing the time-base expanded PCM signal to the third and fourth channels of the 4-channel PCM signal.

The above and other, objects, features, and advantages of the present invention will become apparent from the following detailed description thereof, which is to be read in connection with the accompanying drawings in which the like reference numerals represent the same or similar elements.

BRIEF DESCRIPTION OF THE DRAWINGS

FIGS. 10A–10M are waveforms and timing charts useful in explaining the record and playback operations of a rotary head digital audio tape recorder.

DETAILED DESCRIPTION OF THE PREFERRED EMBODIMENT

Figure 3:
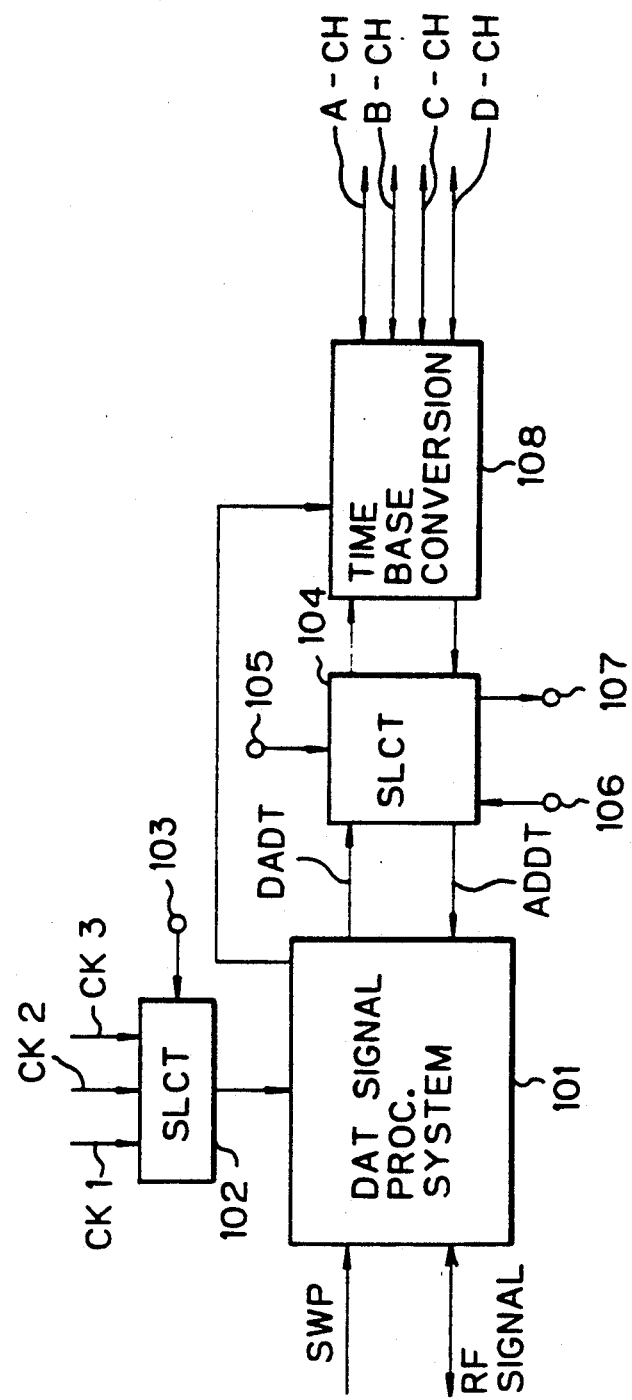
FIG. 3 is a block diagram of one embodiment of the present invention.

FIG. 3 shows a DAT signal processing system 101 that includes a timing generator section, an A/D converter section, a D/A converter section, a digital I/O interface section, an error correction circuit, a buffer RAM, a modulator section, a demodulator section, and a subcode processing section, for example. Therefore, an RF signal for recording can be formed by supplying an analog audio signal or a digital audio signal to the signal processor system 101, and the analog audio signal or the digital audio signal can be extracted by supplying signal processor system 101 with a playback RF signal.

The signal processing system 101 is supplied with a switching pulse signal SWP synchronized with the rotating phase of the rotary drum in the digital tape recorder. In the 32k-LP mode, in which the drum revolution is 1000 rpm, the switching pulse signal SWP is a pulse signal whose level is inverted every 30 ms. In contrast, in the standard 48k mode and the 32k-4CH mode, in which the drum revolution is 2000 rpm, the switching pulse signal SWP is a pulse signal whose level is inverted every 15 ms. Signal processing system 101 operates at a frequency of 64 kHz, which is two times the sampling frequency Fs. A sampling clock signal is selected from among three possibilities by a selector 102 and is fed to signal processing system 101. Specifically, a first sampling clock signal CK1 has a frequency of 48 kHz, a second sampling clock signal CK2 has a frequency of 32 kHz, which is the sampling frequency Fs, and a third sampling clock signal CK3 has a frequency of 64 kHz, which is twice the sampling frequency. Selector 102 is controlled by a mode switching signal fed in at a selector terminal 103.

The digital signal ADDT in the digital audio interface format is supplied at a digital input of signal processing system 101 through selector 104. Selector 104 is responsive to a mode switching signal fed in at a selector terminal 105 to switch signal paths depending on the 2-channel mode or the 4-channel mode. In the case of the 2-channel mode, the signals are input at terminal 106 and output at terminal 107, whereas in the case of the 4-channel mode, a digital signal processed by a time-base converting circuit 108 is selected by selector 104.

Time-base converting circuit 108 performs compression and expansion of the time-base of a PCM signal consisting of 4 channels, A-CH, B-CH, C-CH, and D-CH, in which the sampling frequency Fs is 32 kHz and the quantizing bit number is 16 bits. More specifically, during the recording operation time-base converting circuit 108 carries out time-base compression of the PCM signal by one-half to form data having a sampling frequency 2Fs and, during playback operation, performs time-base expansion of the PCM signal by two to form data having the standard sampling frequency Fs. The quantizing bit number of 16 bits undergoes nonlinear compression into 12 bits in signal processing system 101 during the recording operation. Time-base converting circuit 108 is supplied with the sampling clock signal having a frequency of 2Fs from signal processing system 101 and consists of a buffer memory and a memory control circuit.

Figure 4:
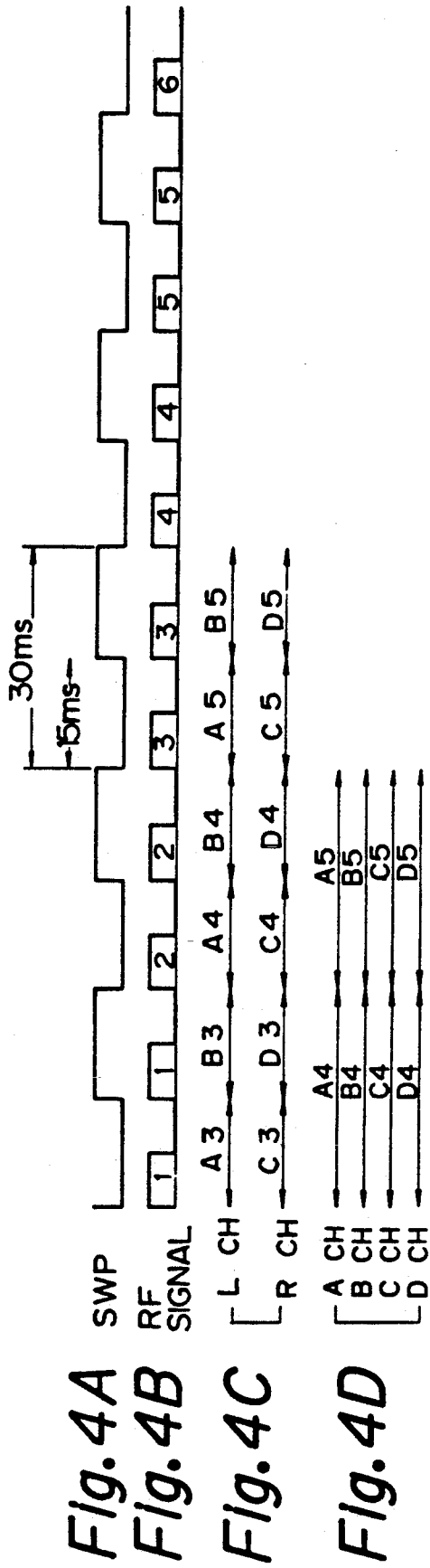
FIG. 4A–4D are timing charts useful in explaining the operation of the embodiment of FIG. 3 during recording.

FIGS. 4A–4D are timing charts showing operation of the embodiment described above during recording of the 4-channel PCM signal. FIG. 4A shows the switching pulse signal SWP synchronized with the rotation of the drum to which a pair of rotary heads are attached and arranged 180° apart to alternately contact a magnetic tape wrapped around the drum along an arc of 90°. The magnetic tape runs at a standard speed of 8.15 mm/s. FIG. 4B shows the timing of a recording RF signal, and as seen therein one of the rotary heads records data in the first half-period of 15 ms of the 30 ms cycle of the switching pulse signal SWP, and the other rotary head records data in the second half-period of 15 ms. In FIG. 4B pieces of data labelled with identical numbers are meant to represent an interleave pair, and these numbers correspond to the data numbers shown in FIG. 4C and 4D.

The 4-channel PCM audio signals shown in FIG. 4D are fed to time-base converting circuit 108 that performs one-half compression to form 2-channel time-divisional multiplex PCM signals corresponding to the L channel and the R channel, as shown in FIG. 4C. In this case, the A-channel PCM signal is located in the first half of the 30 ms period of the L channel, and the B-channel PCM signal is located in the second half. Similarly, the C-channel PCM signal is located in the first half of the 30 ms period of the R channel, and the D-channel PCM signal is located in the second half thereof.

Figure 5:
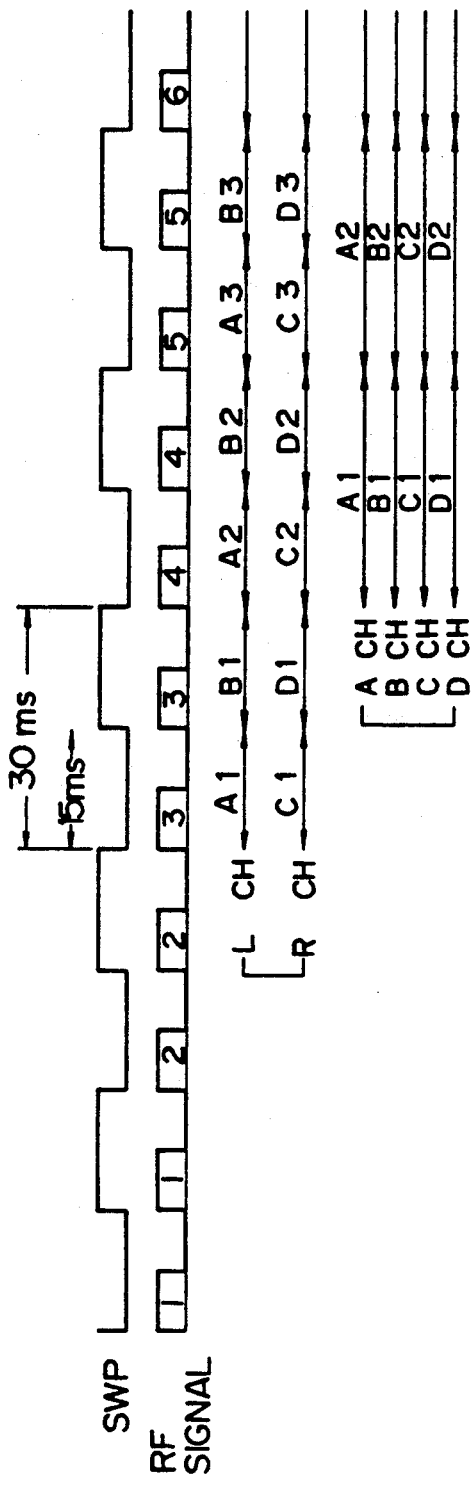
FIGS. 5A–5D are timing charts useful in explaining the operation of the embodiment of FIG. 3 during playback.

During playback, an RF signal shown in FIG. 5B is fed to signal processing system 101 in synchronization with the switching pulse signal SWP, which is shown in FIG. 5A. Signal processing system 101 carries out demodulation, error correction, interpolation and other signal processing operations and, as shown in FIG. 5C, reproduced data having the same sequence as the recording signal shown in FIG. 4C is obtained. In time-base converting circuit 108, the playback data signal undergoes time-base expansion by two, so that the original 4-channel PCM signals are obtained, as shown in FIG. 5D.

Figure 6:
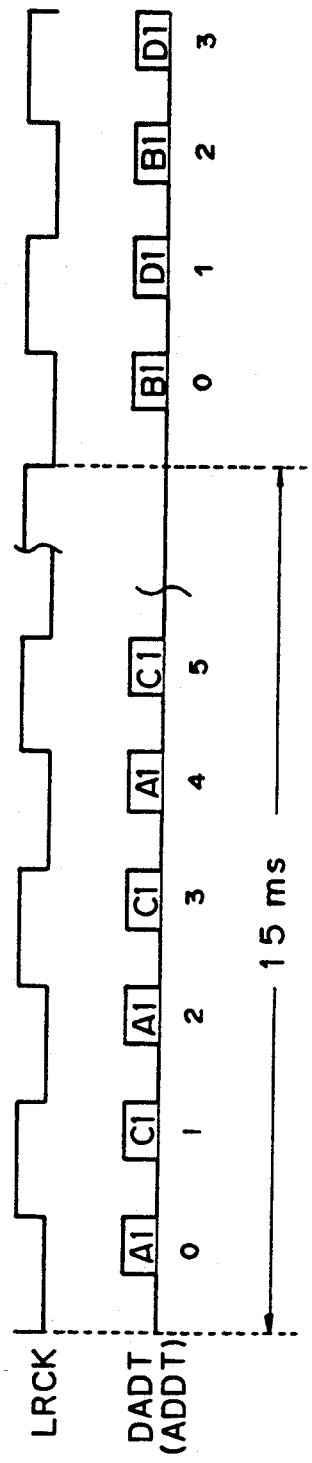
FIGS. 6A and 6B are timing charts showing digital data in a signal processing system according to the present invention.

The digital signal input ADDT supplied from time-base converting circuit 108 to the digital I/O interface section (not shown) of signal processing system 101 through selector 104 and the digital signal DADT supplied from the digital I/O interface section (not shown) of signal processing system 101 to time-base converting circuit 108 through selector 104 are in the digital audio interface format, as shown in FIGS. 6A and 6B. FIG. 6A shows a clock signal LRCK having a frequency 2Fs and whose level is inverted upon every occasion of an L-channel word and an R-channel word, and FIG. 6B shows the digital signal DADT or ADDT.

Figure 1:
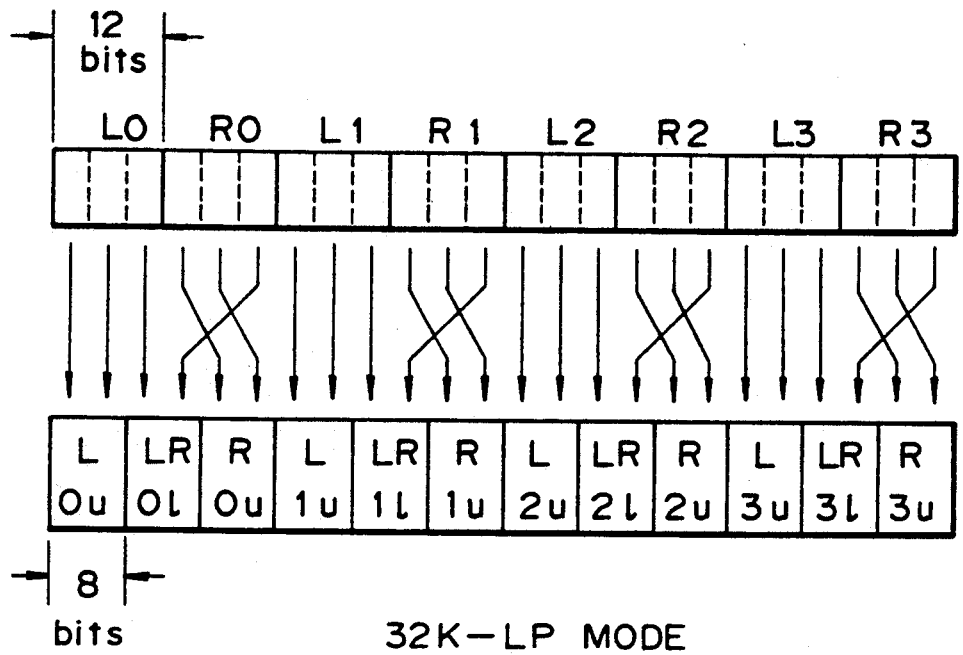
FIG. 1 is a diagrammatic representation showing a word-to-symbol conversion in the 32k-LP mode.
Figure 2:
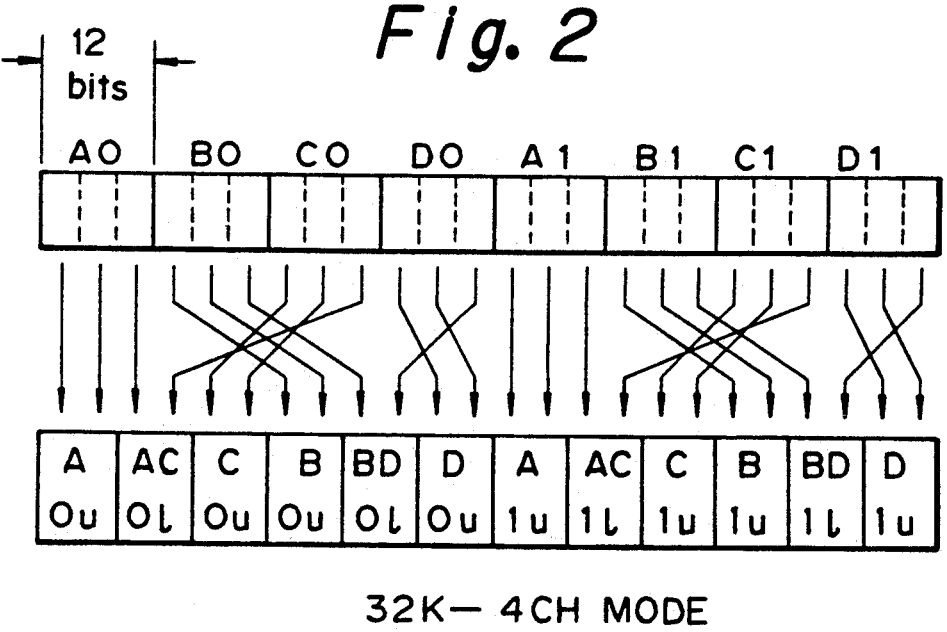
FIG. 2 is a diagrammatic representation showing a word-to-symbol conversion in the 32k-4CH mode.

Signal processing system 101 performs the same signal processing as in the 32k-LP mode except that the sampling clock signal frequency is doubled. From the word-to-symbol conversion rules shown in FIGS. 1 and 2 it will be noted that the 32k-LP mode and the 32k-4CH mode result in the same conversion rule when regarding L0 as A0, R0 as C0, L1 as B0, and R1 as D0. Therefore, in performing word-to-symbol conversion and regarding the A-channel and the C-channel and the L-channel and the R-channel, respectively, and regarding the B-channel and the D-channel as the L-channel and the R-channel, respectively, conversion of the 32k-4CH mode is carried out in signal processing system 101. Nevertheless, because the number of channels is doubled, the PCM signal rate input to or output from signal processing system 101 must be double that of the 32k-LP mode, so that it is required that signal processing system 101 operates with a sampling clock of 2Fs.

According to this invention, 4-channel PCM signals can be recorded in the 32k-4CH mode of R-DAT, with a simple arrangement using the time-base converting circuit added externally, by converting the 4-channel PCM signals into 2-channel time-divisional multiplex PCM signals using time-base compression and by operating the signal processing system at 2Fs, which is 64 kHz.

Figure 7:
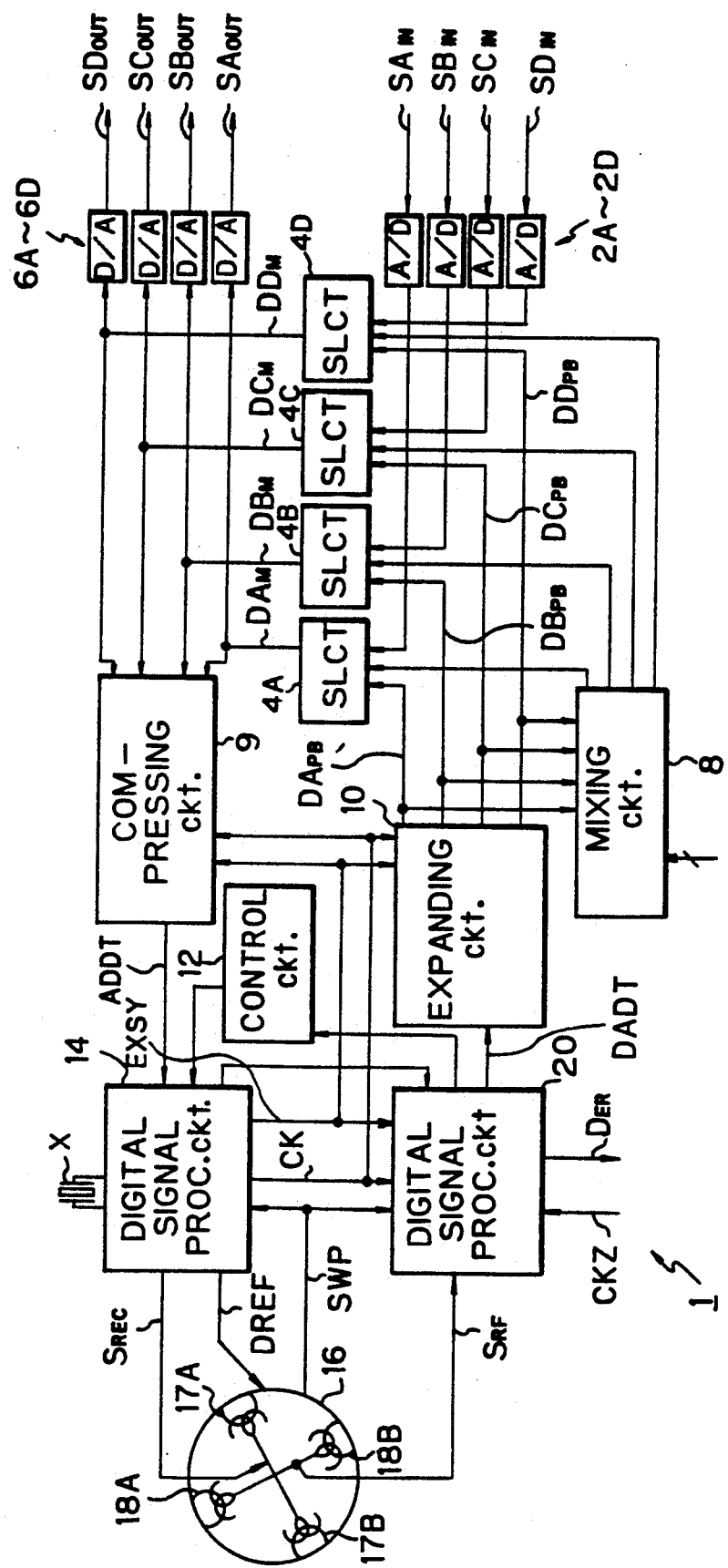
FIG. 7 is a block diagram of a digital audio tape recorder including an embodiment of the present invention.

FIG. 7 shows a magnetic recording and reproducing apparatus 1 capable of recording and reproducing 4-channel digital audio signals, $SA_{IN}$, $SB_{IN}$, $SC_{IN}$, $SD_{IN}$, $SA_{OUT}$, $SB_{OUT}$, $SC_{OUT}$, and $SD_{OUT}$, respectively. More specifically, analog-to-digital (A/D) converter circuits 2A, 2B, 2C, and 2D convert the audio signals $SA_{IN}$, $SB_{IN}$, $SC_{IN}$, and $SD_{IN}$, respectively, into digital signals, with a long-time mode (LP mode) sampling frequency 32 kHz that is the standard sampling frequency applied to digital audio tape recorders.

Selectors 4A, 4B, 4C, and 4D receive the digital audio signals from analog-to-digital converter circuits 2A, 2B, 2C, and 2D, reproduced digital audio signals, and mixing-processed digital audio signals, and selectively output signals to digital-to-analog (D/A) converter circuits 6A, 6B, 6C, and 6D, respectively. Thus, digital audio tape recorder 1 is able to convert the reproduced audio signals into analog signals $SA_{OUT}$, $SB_{OUT}$, $SC_{OUT}$ and $SD_{OUT}$ and to monitor selectively the digital audio signal that is to be recorded on the magnetic tape.

The digital audio signals $DA_M$, $DB_M$, $DC_M$, and $DD_M$ selectively output from selectors 4A, 4B, 4C, and 4D are fed to a compressing circuit 9 where they are stored in an internal memory and segmented into blocks in units of 60 msec. Compression circuit 9 sequentially outputs at a double sampling frequency of 64 kHz the digital audio signals $DA_M$, $DB_M$, $DC_M$ and $DD_M$ A stored in the internal memory circuit, thereby converting the digital audio signals $DA_M$, $DB_M$, $DC_M$, and $DD_M$ into a 2-channel digital audio signal ADDT, in which the digital audio signals $DA_M$ and $DB_M$ are serially followed by the digital audio signals $DC_M$ and $DD_M$.

In contrast to the recording operation, an expanding circuit 10 stores in an internal memory the reproduced 2-channel digital audio signal DADT output from a digital signal processing circuit 20 and converts the digital audio signal DADT having the sampling frequency of 64 kHz into 4-channel playback digital audio signals $DA_{PB}$, $DB_{PB}$, $DC_{PB}$ and $DD_{PB}$, and supplies these to a mixing circuit 8. Thus, the 4-channel reproduced and expanded digital audio signals $DA_{PB}$, $DB_{PB}$, $DC_{PB}$, and $DD_{PB}$ can be mixed with any desired digital audio signals that are fed in to mixing circuit 8. Therefore, selectors 4A, 4B, 4C, and 4D can selectively supply either the 4-channel digital audio signals $DA_{PB}$, $DB_{PB}$, $DC_{PB}$, and $DD_{PB}$, the mixed processed digital audio signals, or the input audio signals that have been converted into digital signals by the analog-to-digital converter circuits 2A, 2B, 2C and 2D. Thus, apparatus 1 can selectively perform edit processing of the reproduced digital audio signals $DA_{PB}$, $DB_{PB}$, $DC_{PB}$ and $DD_{PB}$.

A second digital processing circuit 14 converts the 2-channel digital audio signal ADDT from compressing circuit 9 into a record signal $S_{REC}$ and supplies it to magnetic recording heads 18A and 18B. In contrast, digital signal processing circuit 20 demodulates a playback signal $S_{RF}$ supplied from magnetic playback heads 17A and 17B and generates the digital audio data signal DADT fed to expanding circuit 10.

Magnetic recording heads 18A and 18B are oppositely disposed 180° apart on a rotary drum 16 having a diameter of 30 mm that has the magnetic tape wrapped around for 90°. Magnetic playback heads 17A and 17B are disposed 90° from the respective recording magnetic heads 18A and 18B.

Figure 8:
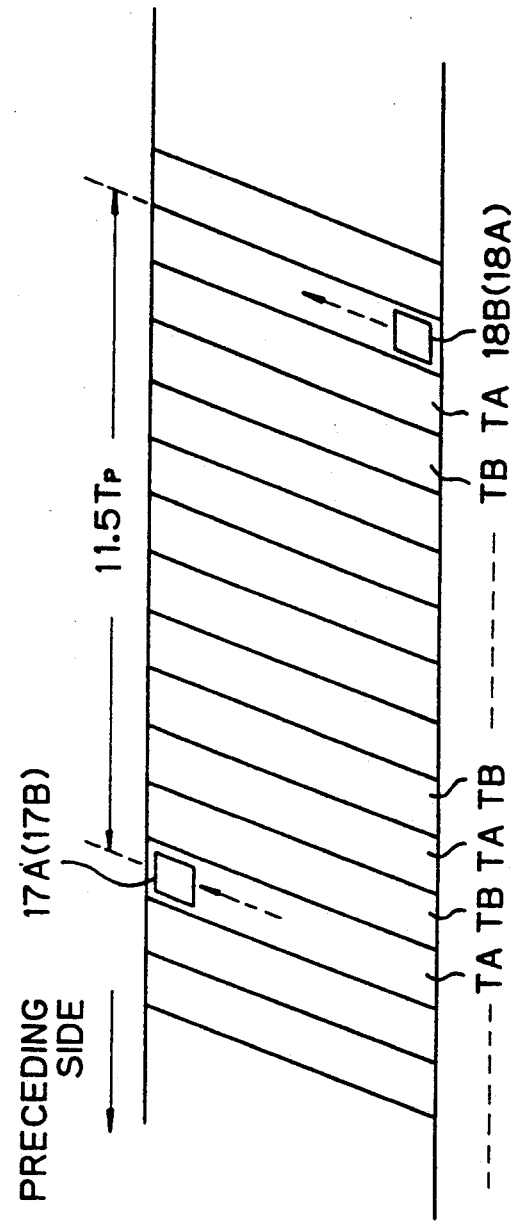
FIG. 8 is a diagrammatic representation showing scanning movements of the magnetic heads in a rotary head digital audio tape recorder.

Referring to FIG. 8, magnetic playback heads 17A and 17B are offset in height from magnetic recording heads 18A and 18B by a distance equal to 11.5 times the track pitch (Tp), so as to scan preceding tracks. Thus, the magnetic recording and reproducing apparatus 1 is configured to first edit the reproduced audio data DADT obtained from magnetic playback heads 17A and 17B and subsequently to re-record it in new record tracks by magnetic recording heads 18A and 18B.

Rotary drum 16 is driven so as to effect one revolution in a half cycle (30 msec) of the interleave cycle of the long-time mode (LP), which is the standard applied to digital audio tape recorders, thereby to rotate at double the normal rotating speed in the long-time mode. The magnetic tape is controlled so as to pass two tracks in one rotation cycle of rotary drum 16. Tracking control can be done in response to a tracking error signal supplied from a tracking control circuit (not shown). As a result, in magnetic recording and reproducing apparatus 1, magnetic recording heads 18A and 18B scan the magnetic tape at double the rotation speed of the long-time mode and form the same record tracks as the long-time mode.

Digital signal processing circuits 14 and 20 are formed of integrated circuits each having the same arrangement each incorporating recording and playback circuits. Their operating modes are switched based on control data supplied from a control circuit 12. In this embodiment, digital signal processing circuit 14 operates in the recording mode utilizing its recording circuits, whereas digital signal processing circuit 20 operates in the playback mode utilizing its playback circuits.

Digital signal processing circuit 14 includes a quartz crystal X and produces predetermined clock signals CK and EXSY and also operates internally on those same clock signals. Digital signal processing circuit 20 operates based on the clock signals CK and EXSY supplied from digital signal processing circuit 14. As a result, digital signal processing circuits 14 and 20 operate in synchronization. Digital signal processing circuit 20 outputs information, obtained by reproducing the recorded information from the magnetic tape, to digital signal processing circuit 14 through control circuit 12, so that the digital audio signal is recorded based on the reproduced information.

Figure 9:
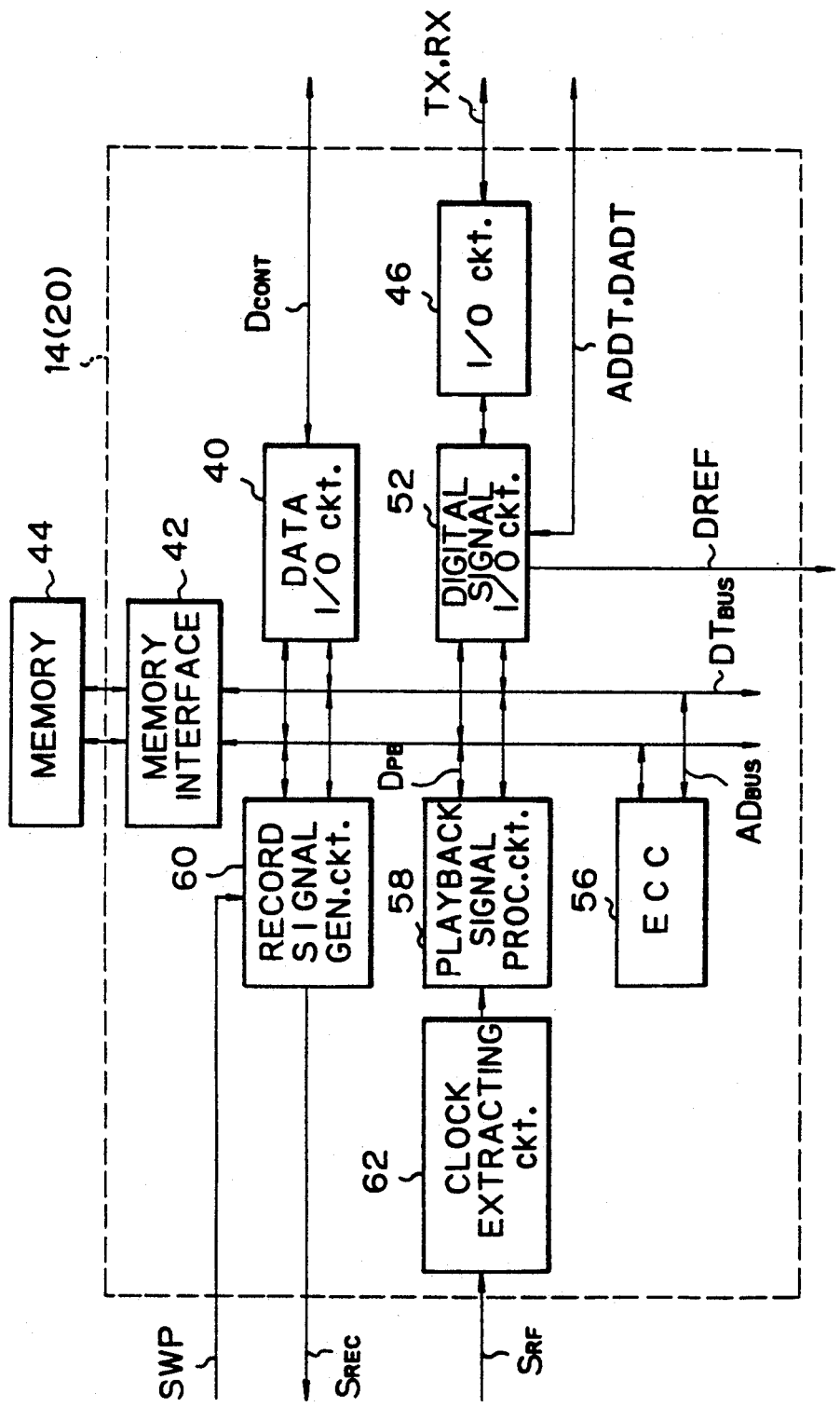
FIG. 9 is a block diagram of a digital signal processing circuit according to an embodiment of the present invention.

More specifically, as shown in FIG. 9, a data input-/output circuit 40 in digital signal processing circuits 14 and 20 receives control data $D_{CONT}$ supplied from control circuit 12 and subsequently stores the control data $D_{CONT}$ in a predetermined area of a memory circuit 44 through a memory interface circuit 42. Based on the control data $D_{CONT}$, the respective data input/output circuit 40 switches the operation of the digital signal processing circuits 14 and 20. As a result, digital signal processing circuits 14 and 20 are set up in a double-speed recording/playback mode for producing the recording signal $S_{REC}$ at the double processing speed, as compared to the normal long-time mode, and for processing the reproduced signal $S_{RF}$.

An input/output circuit 46 extracts audio data from a digital audio signal RX in the AES/EBU format supplied from a source external to the digital audio tape recorder in the normal recording mode. In the normal playback mode, input/output circuit 46 converts playback audio data supplied from a digital signal input/output circuit 52 into a digital audio signal TX in the AES/EBU format and outputs it. In the double-speed recording/playback mode of the present embodiment, its operation is then subsequently stopped.

A digital signal input/output circuit 52 loads the control data $D_{CONT}$ that is supplied from memory circuit 44 to a data bus $DT_{BUS}$ through memory interface circuit 42 and switches over its operation based on the control data $D_{CONT}$. Digital signal input/output circuit 52 of digital signal processing circuit 14 sequentially counts a given clock signal in an internal counter circuit and produces a rotary drum reference signal DREF. In this embodiment, which is set up in the double-speed recording/playback mode, digital signal input/output circuit 52 forms a rotary drum reference signal DREF that is repeated at 30 msec intervals, as shown in FIG. 10A. As a result, digital signal processing circuits 14 and 20 operate in reference to the rotary drum reference signal DREF. Digital signal input/output circuit 52 of digital signal processing circuit 20, which is set up in the playback mode, also sequentially processes the playback signal $S_{RF}$, with reference to the rotary drum reference signal DREF.

A servo circuit (not shown) for driving rotary drum 16 forms in the known manner a switching pulse signal SWP whose signal level is inverted at the scan starting times of magnetic recording heads 18A and 18B. The switching pulse signal SWP is supplied to both digital signal processing circuits 14 and 20. In addition, the servo circuit drives rotary drum 16 so that the switching pulse signal SWP and the rotary drum reference signal DERF are synchronized in phase.

Digital signal input/output circuit 52, during the recording mode, selectively receives the digital audio signal ADDT supplied from compressing circuit 9, and segments the selectively entered digital audio signal into blocks in interleave cycles, with reference to the count value of the counter circuit, for producing the rotary drum reference signal DREF. In this operation, digital signal input/output circuit 52 sequentially supplies the digital audio signal to memory circuit 44 of the data bus $DT_{BUS}$, with reference to the count value of the counter circuit, and thereby performs interleave processing for each block of the digital audio signal, which has been segmented into blocks in interleave cycles.

In the playback mode, digital signal input/output circuit 52 sequentially loads the playback audio data stored in memory circuit 44, with reference to the count value of the counter circuit, and thereby performs the deinterleave processing of the playback audio data to convert it into the playback digital audio signal DADT. Signal DADT is then fed from digital signal input/output circuit 52 to input/output circuit 46 and expanding circuit 10.

In this manner, because digital signal processing circuits 14 and 20 are set up in the recording mode and the playback mode of the double-speed recording/playback mode, respectively, digital signal input/output circuit 52 of digital signal processing circuit 14 stores in an internal memory circuit in interleave cycles of 30 ms the digital audio signal ADDT having the double sampling frequency of the long-time mode (LP), whereas the playback digital audio signal DADT, which is serial and has the same sampling frequency, is obtained through digital signal input/output circuit 52 of digital signal processing circuit 20.

An error detection/correction circuit (ECC) 56 loads the control data $D_{CONT}$ from memory circuit 44 and switches over its operation based on the control data $D_{CONT}$, similarly to digital signal input/output circuit 52. Error detection/correction circuit 56, in the recording mode, sequentially loads the audio data stored in memory circuit 44 and produces first (C1) and second (C2) codes for error detection and correction in block units. Subsequently the first and second codes are stored in memory circuit 44. At the same time, error detection/correction circuit 56 sequentially loads subcode data that is to be recorded in a subdata are and that relates to recording information stored in memory circuit 44 and produces an error detection/correction code (C1) and stores it in memory circuit 44. In the playback mode, error detection/correction circuit 56 sequentially loads the playback data $D_{PB}$ stored in memory circuit 44, carries out error detection and error correction of the playback data $D_{PB}$, and stores it in memory circuit 44.

Therefore, in this embodiment, because digital signal processing circuits 14 and 20 are set up in the recording mode and the playback mode of the double-speed recording/playback mode, respectively, error detection/correction circuit 56 of digital signal processing circuit 14 sequentially produces error detection/correction codes regarding the audio data, whereas error detection/correction circuit 56 of digital signal processing circuit 20 performs error detection/correction processing on the playback data $D_{PB}$.

A recording signal generating circuit 60, in the same manner as digital signal input/output circuit 52, loads the control data $D_{CONT}$ from memory circuit 44 and switches over its operation in response thereto. That is, in the recording mode recording signal generating circuit 60 sequentially loads the input audio data, the error detection/correction code, and the like that are stored in the memory 44 and generates the recording signal $S_{REC}$. Recording signal generating circuit 60, referring to a given channel clock signal, generates a recording signal $S_{REC}$ having the transmission speed of 4.075 Mbps in the normal long-time mode and generates a record signal $S_{REC}$ having the transmission speed of 9.408 Mbps in the standard-time mode. Recording signal generating circuit 60 also generates a recording signal $S_{REC}$ according to the standard format applied to digital audio tape recorders. Recording signal generating circuit 60 does not operate in the playback mode.

As a result, the digital audio signal ADDT, which is serial with the double sampling frequency of the long-time mode, can be converted into the recording signal $S_{REC}$, as shown in FIG. 10B, having the double transmission speed of the long-time mode via recording signal generating circuit 60 of digital signal processing circuit 14 according to the standard format applied to digital audio tape recorders.

Recording signal generating circuit 60 supplies the recording signal $S_{REC}$ to magnetic recording heads 18A and 18B through a recording signal amplifier (not shown). Thus, the recording signal $S_{REC}$ having the double transmission speed of the long-time mode can be recorded by magnetic heads 18A and 18B that sequentially form record tracks at the double speed of the long-time mode. Therefore, the digital audio tape recorder can record 4-channel digital audio signals $DA_M$, $DB_M$, $DC_M$, and $DD_M$ with the same recording wavelength as the normal long-time mode. The 4-channel digital audio signal $DA_M$, $DB_M$, $DC_M$, and $DD_M$ can be recorded using digital signal processing circuit 14 used in a conventional digital audio tape recorder according to the 4-channel format of the digital audio tape recorder. Therefore, a digital audio tape recorder that is flexible in operation and has a simple overall arrangement can be obtained.

In the playback mode, a clock extracting circuit 62 extracts a playback clock signal from the playback signal $S_{RF}$, as shown in FIG. 10C, obtained through magnetic playback heads 17A and 17B and supplies the playback clock signal, as well as the playback signal $S_{RF}$, to a playback signal processing circuit 58. Playback signal processing circuit 58 ceases operation in response to control data $D_{CONT}$ in the recording mode. In the playback mode, however, playback signal processing circuit 58 demodulates the playback signal $S_{RF}$ with reference to the playback clock and subsequently supplies the demodulated playback data $D_{PB}$ obtained thereby to memory circuit 44.

In this manner, because digital signal processing circuits 14 and 20 are set up in the recording mode and in the playback mode, respectively, and magnetic playback heads 17A and 17B scan the tracks before magnetic recording heads 18A and 18B, the playback signal $S_{RF}$ can be obtained through magnetic playback heads 17A and 17B from tracks on which signals are then re-recorded subsequently. Additionally, since magnetic playback heads 17A and 17B scan the magnetic tape that has signals recorded thereon With the same recording wavelength as the normal long-time mode, but at the double scan speed of the long-time mode, a playback signal $S_{RF}$ having the double transmission speed, as compared to the normal long-time mode, can be obtained in the same manner as the case of the recording signal $S_{REC}$. Therefore, in digital signal processing circuit 20, the demodulated playback data $D_{PB}$ is stored in memory circuit 44 at the double processing speed of the normal long-time mode, subsequently undergoes error correction processing in error detection/correction circuit 56, and is sequentially supplied through digital signal input/output circuit 52, whereby the digital audio signal ADDT, as shown in FIGS. 10D and 10E, that was recorded on the magnetic tape can be reproduced with a delay of only two interleave cycles and with the sampling frequency of 64 kHz.

When recording, the 4-channel digital audio signals $DA_M$, $DB_M$, $DC_M$, and $DD_M$ are converted in compressing circuit 9 with the double sampling frequency into the 2-channel digital audio signal ADDT, in which the digital audio signals $DC_M$ and $DD_M$ are repeated following the digital audio signals $DA_M$ and $DB_M$. During playback, there is obtained in the first channel the digital audio signal DADT, including data A0, A1, A2, ..., obtained by time-base compressing by one-half the digital audio signal recorded through the first selector circuit 4A and data B0, B1, B2, ..., obtained by time-base compressing by one-half the digital audio signal recorded through the second selector circuit 4B. These signals are serial and in alternating order. Further, in the second channel, there is obtained the digital audio signal DADT, including data C0, C1, C2, ..., obtained by time-base compressing by one-half the digital audio signal recorded through the third selector circuit 4C and data D0, D1, D2, ..., obtained by time-base compressing by one-half the digital audio signal recorded through the fourth selector circuit 4D. These signals are also serial and in alternating order. Therefore, by first expanding the time base thereof through expanding circuit 10 and subsequently supplying it through selector circuits 4A, 4B and through digital-to-analog converter circuits 6A, 6B, 4-channel audio signals $SA_{OUT}$, $SB_{OUT}$, $SC_{OUT}$ and $SD_{OUT}$, as shown in FIGS. 10F, 10G, 10H and 10I, respectively, can be reproduced.

Thus, the digital audio tape recorder can record and play back 4-channel digital audio signals, thereby improving the convenience and utility to the user.

On the other hand, by first mixing the playback digital audio signals $DA_{PB}$, $DB_{PB}$, $DC_{PB}$, and $DD_{PB}$ in mixing circuit 8 and subsequently compressing the time base thereof through compressing circuit 9 there is obtained in the first channel a digital audio signal DADT, as shown in FIG. 10J, including data MA0, MA1, MA2, ..., obtained by time-base compressing by one-half the digital audio signal $DA_M$ entering through selector 4A and data MB0, MB1, MB2, ..., obtained by time-base compressing by one-half the digital audio signal $DB_M$ entering through selector 4B. These signals are serial and in alternating order. In the second channel, there is obtained a digital audio signal DADT, as shown in FIG. 10K, including data MC0, MC1, MC2, ..., obtained by time-base compressing by one-half the digital audio signal $DC_M$ entering through selector 4C and data MD0, MD1, MD2, ..., obtained by time-base compressing by one-half the digital audio signal $DB_M$ entering through selector 4D. These signals are also serial and in alternating order.

Therefore, by recording the digital audio signal ADDt by first converting it into the recording signal $S_{REC}$ through digital signal processing circuit 14, mixed and processed digital audio signals $DA_M$, $DB_M$, $DC_M$, and $DD_M$ can be re-recorded on record tracks scanned by magnetic playback heads 17A and 17B, so that edit processing of 4-channel digital audio signals is facilitated. That is, it is possible to replace digital audio signals of different channels or, by mixing digital audio signals re-record them in different channels. Therefore, the convenience of the digital audio tape recorder is further improved.

Playback signal processing circuit 58 is configured to detect a bit error in the playback data $D_{PB}$ using the error detection/correction code recorded along with the audio data and subsequently supply a detection result $D_{ER}$. Therefore, in the digital audio tape recorder, over-write recording is possible for all tracks, while monitoring the playback condition, and the digital audio signal can be recorded reliably.

Playback signal processing circuit 58 of digital signal processing circuit 14 is configured to store the subcode data in memory circuit 44 and thereby supply subcode data $D_{SUBPB}$, as shown in FIG. 10L, to digital signal processing circuit 14 through data input/output circuit 40. Therefore, when recording mixing-processed digital audio signals $DA_M$, $DB_M$, $DC_M$, and $DD_M$, for example, by supplying the subcode data $D_{SUBPB}$ as recording information, as shown in FIG. 10M, to data input/output circuit 40 of digital signal processing circuit 14 through control circuit 12, the recording signal $S_{REC}$ can be generated sequentially in the standard format for digital audio tape recorders.

In the aforementioned arrangement, 4-channel audio signals $SA_{IN}$, $SB_{IN}$, $SC_{IN}$ and $SD_{IN}$, are first converted into digital signals by analog-to-digital converter circuits 2A, 2B, 2C, and 2D with the sampling frequency of 32 kHz of the long-time mode, are subsequently time-base compressed by compressing circuit 9 via selectors 4A, 4B, 4C and 4D, and are converted into the 2-channel digital audio signal ADDt, which is a serial signal having the double sampling frequency 64 kHz. The 4-channel audio signals $SA_{IN}$, $SB_{IN}$, $SC_{IN}$, and $SD_{in}$ that are converted into digital signals can be output a monitor signals through digital-to-analog converter circuits 6A, 6B, 6C, and 6D, respectively.

In the case of performing mixing processing and edit processing, reproduced digital audio signals $DA_{PB}$, $DB_{PB}$, $DC_{PB}$, and $DD_{PB}$ supplied from expanding circuit 10, or digital audio signals supplied from mixing circuit 8, are time-base compressed in compressing circuit 9 via selectors 4A, 4B, 4C, and 4D, and are converted into the 2-channel digital audio signal ADDT, which is a serial signal having the sampling frequency of 64 kHz. The 2-channel digital audio signal ADDT is converted into the recording signal $S_{REC}$ by digital signal processing circuit 14 operative in the recording mode of the double-speed recording/playback mode, and it is subsequently supplied to magnetic recording heads 18A and 18B that scan the magnetic tape after magnetic playback heads 17A and 17B. Accordingly, it is possible to selectively record the digital audio signal $SA_{IN}$, $SB_{IN}$, $SC_{IN}$, and $SD_{IN}$ that is being fed into digital audio tape recorder 1 or to record the 4-channel digital audio signals which have been mixing-processed and edit-processed.

The playback signals $S_{RF}$ supplied from magnetic playback heads 17A and 17B are demodulated in digital signal processing circuit 20 operating in the playback, double-speed recording/playback mode and are subsequently time-base expanded in expanding circuit 10. Thus, the 4-channel digital audio signals can be reproduced.

According to the above-described embodiment, 4-channel digital audio signals are time-base compressed and converted into a 2-channel digital audio signal which is recorded and reproduced in a double speed recording/playback mode, and the reproduced digital audio signal is time-base expanded and converted into the original 4-channel audio signals. Therefore, recording and playback of 4-channel audio signals can be carried out with a relatively simple arrangement compared with previous proposals.

The foregoing embodiment was described in regard to recording and reproducing 4-channel digital signals, however, the present invention is not limited to this example and may be widely used for any multi-channel digital audio signals that are to be recorded and reproduced.

As described above, according to the present invention by converting multiple-channel digital audio signals into a time-base compressed digital audio signal for recording and playback purposes and upon playback of the time-base compressed digital audio signal by converting it into the original multiple-channel audio, magnetic recording/playback apparatus having a simple arrangement but being capable of recording and reproducing multiple-channel digital audio signals can be obtained.

Having described a specific preferred embodiment of the present invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A 4-channel PCM signal processing apparatus for processing, prior to recording, 4-channel PCM signals having a sampling frequency Fs and consisting of first, second, third, and fourth channels, said apparatus comprising:

means for compressing the time-base of the 4-channel PCM signals by one-half to form 2-channel time-base-compressed PCM signals in which said first and second channels are time-divided and multiplexed and said third and fourth channels are time-divided and multiplexed, a signal processor having a signal processing period Td for performing signal processing and operating at a sampling frequency Fs, and means for operating said signal processor with a sampling clock frequency of 2Fs and for changing said signal processing period to ½ Td when said time-base compressed PCM signals are supplied thereto from said means for compressing.

2. A 4-channel PCM signal processing apparatus for processing reproduced 2-channel PCM signals and producing 4-channel PCM signals that have a sampling frequency Fs and that consist of first, second, third, and fourth channels, said apparatus comprising:

a signal processor having a signal processing period Td for performing signal processing and operating at a sampling frequency Fs, means for operating said signal processor with a sampling clock frequency of 2Fs and for changing said signal processing period to ½ Td; and time-base control means for producing 4-channel PCM signals by expanding by two the time-base of one PCM signal channel of the 2-channel PCM signal from said signal processor, said control means being operated with a clock frequency of 2Fs, and distributing the time-base expanded PCM signal of said one PCM signal channel to said first channel and second channel of said 4-channel PCM signal, and by expanding by two the time-base of the other PCM signal channel of the 2-channel PCM signal from said signal processor, said control means being operated with a clock frequency of 2Fs, and distributing the time-base expanded PCM signal of said other PCM signal channel to said third channel and fourth channel of said 4-channel PCM signal.

3. Apparatus for processing during recording and reproduction 4-channel PCM signals having a sampling frequency Fs and consisting of first, second, third, and fourth channels, comprising:

a rotary drum on which a tape running at a predetermined speed is obliquely wrapped;

means for rotating said rotary drum at a predetermined speed;

a plurality of recording heads carried on said rotary drum to obliquely scan tracks on the tape;

a plurality of playback heads carried on said rotary drum to obliquely scan tracks on the tape ahead of said recording heads;

a time base compressing circuit for compressing a time-base of said 4-channel PCM signals input thereto by one-half to produce a plurality of 2-channel PCM signals in which the first and second channels are time-divided and multiplexed and the third and fourth channels are time-divided and multiplexed;

a first digital signal processing circuit having a signal processing period Td for performing signal processing and operating at a sampling frequency Fs and including means for operating said first digital signal processing circuit with a sampling clock frequency of 2Fs and for changing said signal processing period to ½ Td, so that said first digital signal processing circuit operates for converting said 2-channel PCM signal from said time-base compressing circuit into a recording signal and for outputting said converted 2-channel PCM signal to said recording heads;

a second digital signal processing circuit having a signal processing period Td for performing signal processing and operating at a sampling frequency Fs and including means for operating said second signal processor with the sampling clock frequency of 2Fs and changing the signal processing period to ½ Td, so that said second signal processing circuit operates for demodulating a playback signal output from said playback heads and for outputting a demodulated playback 2-channel PCM signal; and a time-base expanding circuit for expanding by two the time-base of said playback 2-channel PCM signal from said second digital signal processing circuit and for converting said demodulated playback PCM signal into a 4-channel PCM signal, said time-base expanding circuit being operated with a clock frequency of 2Fs, and distributing the time-base expanded PCM signal of the one PCM signal channel to said first channel and second channel of the 4-channel PCM signal, and by expanding by two the time base of the other PCM signal channel of the 2-channel PCM signal from said second signal processing circuit, said time-base expanding circuit being operated with a clock frequency of 2Fs, and distributing the time-base expanded PCM signal of said other PCM signal channel to said third channel and fourth channel of said 4-channel PCM signal.

4. Apparatus for processing a 4-channel PCM signal processing apparatus according to claim 3 wherein said playback heads are offset from said recording heads by a predetermined amount in a heightwise direction of said rotary drum.

5. Apparatus for processing a 4-channel PCM signal processing apparatus according to claim 3 further comprising a mixing circuit connected between said time-base expanding circuit and said time-base compressing circuit, said mixing circuit being responsive to said time-base expanding circuit and said time-base compressing circuit being responsive to said mixing circuit.

* * * * *